United States Patent [19]

Pardue et al.

[11] 3,855,502
[45] Dec. 17, 1974

[54] GROUND FAULT INTERRUPTER DEVICE

[75] Inventors: Von G. Pardue, Lawrenceville, Ga.; John B. Cataido, Moorestown, N.J.

[73] Assignee: I-T-E Imperial Corporation, Spring House, Pa.

[22] Filed: Feb. 22, 1973

[21] Appl. No.: 334,840

[52] U.S. Cl. .................... 317/18 D, 335/18, 337/71
[51] Int. Cl. ............................................ H02h 1/02
[58] Field of Search ............. 335/18, 20, 21, 22, 23, 335/173; 317/18 R, 18 D; 337/43, 71

[56] References Cited
UNITED STATES PATENTS

| | | | |
|---|---|---|---|
| 2,996,589 | 8/1961 | Myers | 337/43 |
| 3,152,232 | 10/1964 | Leonard | 337/71 |
| 3,256,407 | 6/1966 | Klein | 335/173 |
| 3,539,867 | 11/1970 | Edmunds | 317/18 D |
| 3,555,359 | 1/1971 | Morris | 317/18 D |
| 3,566,318 | 2/1971 | Gelzheiser et al. | 335/23 X |
| 3,636,482 | 1/1972 | Edmunds | 335/18 X |
| 3,717,792 | 2/1973 | Gryctho | 317/18 D |

*Primary Examiner*—R. N. Envall, Jr.
*Attorney, Agent, or Firm*—Ostrolenk, Faber, Gerb & Soffen

[57] ABSTRACT

A ground fault interrupter unit consists of two modules. One of these modules is a standard single pole circuit breaker, and the other module includes fault detection means mounted in an enclosure, with an electromagnetic operator that is energized upon predetermined ground fault conditions. This enclosure is the same width as the width of the housing of the standard single pole circuit breaker. The modules are connected side by side, and mechanical engagement between the operator and overload trip means of the circuit breaker causes the latter to be tripped by actuation of the electromagnetic operator. Overall dimensions of the modules permits installation of the combined assembly in a standard panelboard in the space normally occupied by two circuit breakers of the type found in the ground fault interrupter unit.

3 Claims, 10 Drawing Figures

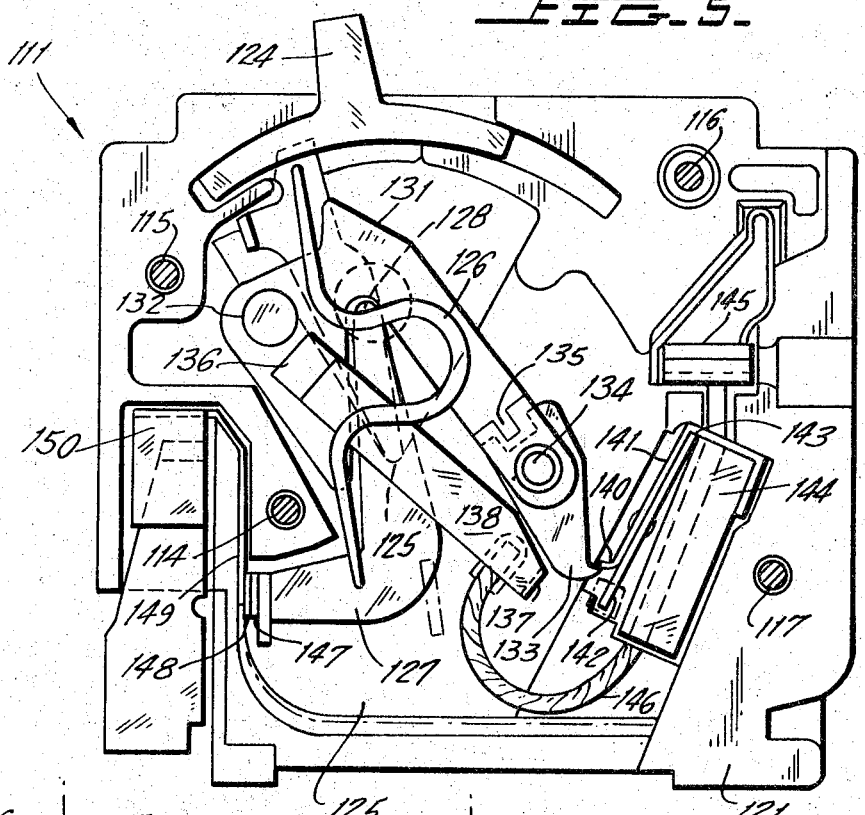
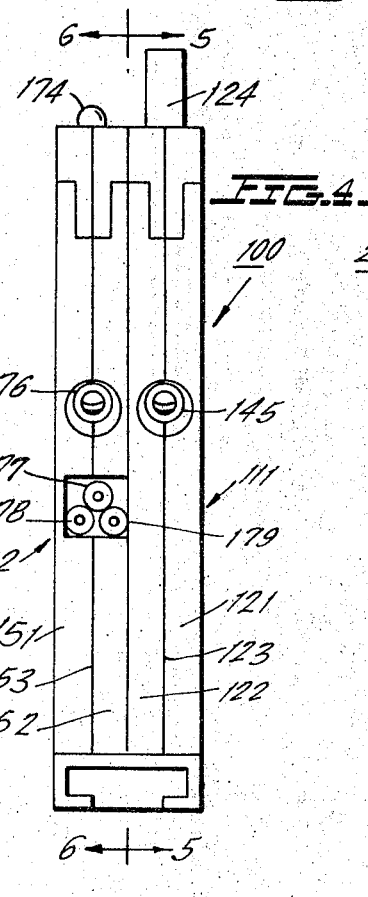
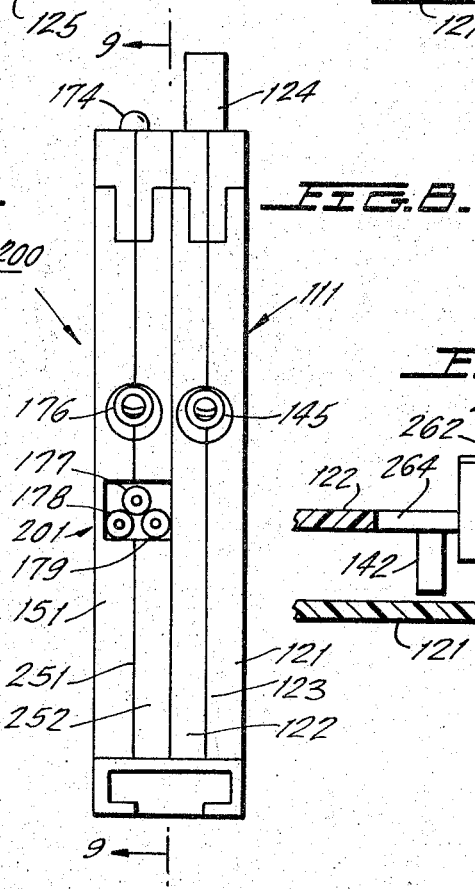
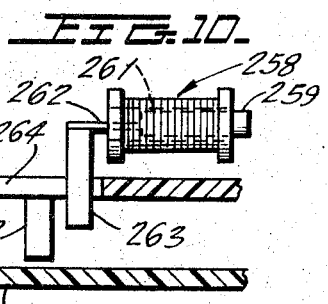

GROUND FAULT INTERRUPTER DEVICE

This invention relates to ground fault protective equipment and relates more particularly to a compact assembly which combines a standard circuit breaker and coordinated ground fault detector.

Recently there has been a significant increase of interest in ground fault protective equipment. Since the circuits to which ground fault protection is applied are energized and deenergized through individual manually operable automatic circuit breakers, many ground fault protective arrangements provide a ground fault detecting means to operate the circuit breaker.

In accordance with the instant invention, the ground fault detecting means is mounted in a housing having the general dimensions of a single pole circuit breaker having means for automatic tripping under overload conditions. The housings for the circuit breaker and ground detector are equal in width and are otherwise constructed so that when these housings are connected side by side the combined unit may readily be mounted in existing panelboards.

Typically a ground fault detecting unit or module includes a differential transformer to detect current imbalance in the load energizing lines and also includes an electromagnet that is energized through operation of the ground fault detector when the current imbalance detected thereby exceeds predetermined limits.

In one embodiment of this invention the armature of the magnet in the ground fault unit is pivotally mounted on an axis aligned with the axis of the circuit breaker trip latch. A tie bar connected to this armature and extending into the circuit breaker housing interconnects the modules to release the circuit breaker latch when the ground fault detector unit magnet is energized.

In a second embodiment of this invention, particularly adapted for use with existing half-inch wide circuit breakers, the armature of the ground fault unit magnet is pivoted about an axis that is transverse to the axis about which the circuit breaker latch is moved for release thereof, and in another embodiment utilizing half-inch wide circuit breakers a linearly moving armature is utilized for the ground fault unit magnet, and added space is obtained for the components of the ground fault unit by having one side thereof closed solely by the circuit breaker unit mounted adjacent thereto.

Accordingly, a primary object of the instant invention is to provide simplified ground fault detection equipment combined with existing circuit breakers.

Another object is to provide compact ground fault detecting units that are mountable in existing panelboards and require a space no greater than the space provided by a single circuit breaker mounting location in the panelboard.

Another object is to provide novel constructions for mechanically coordinating operation of a ground fault detecting unit and a conventional circuit breaker.

These objects as well as other objects of this invention will become readily apparent after reading the following description of the accompanying drawings in which:

FIG. 4 is an elevation of another embodiment of a ground fault interrupter unit, looking toward the load end thereof.

FIG. 5 is a side elevation of the circuit breaker module, looking in the direction of arrows 5—5 of FIG. 4, with the near wall of the module removed.

FIG. 8 is an elevation of a further embodiment of a ground fault interrupter unit, looking toward the load end thereof.

FIG. 9 is a side elevation of the ground fault detector module of FIG. 8 looking in the direction of arrows 9—9.

FIG. 10 is a fragmentary elevation showing engagement of the ground fault detector module trip extension with the overload responsive trip element of the circuit breaker module of FIG. 8.

Figure 2:
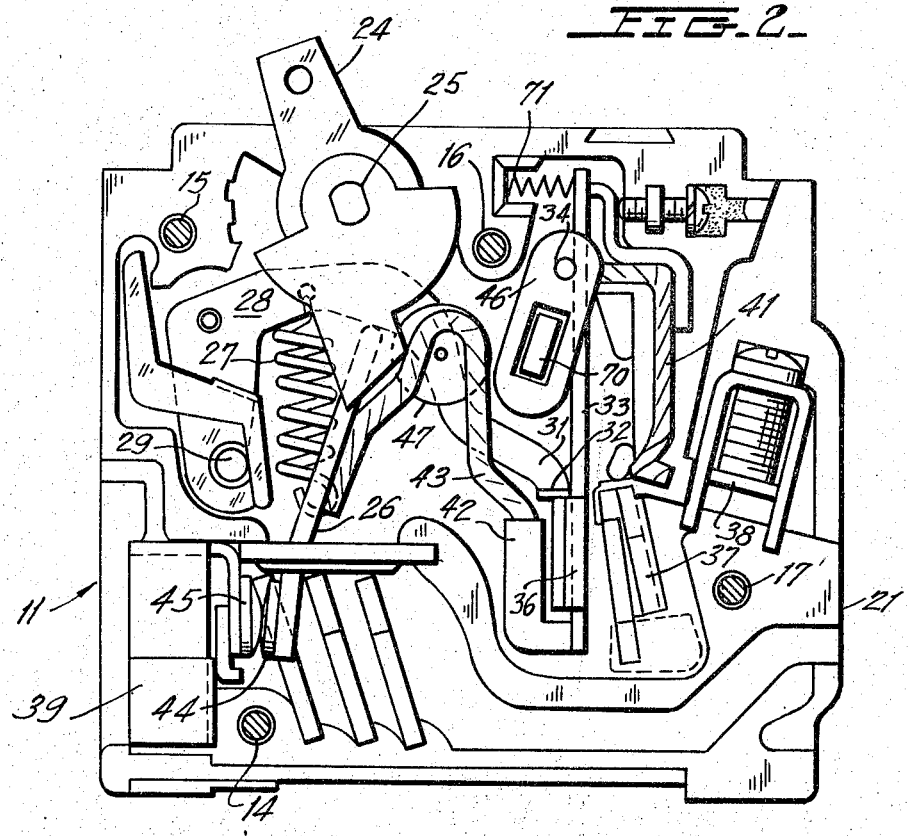
FIG. 2 is a side elevation of the circuit breaker module looking in the direction of arrows 2—2 of FIG. 1, with the near side of the housing removed.
Figure 1:
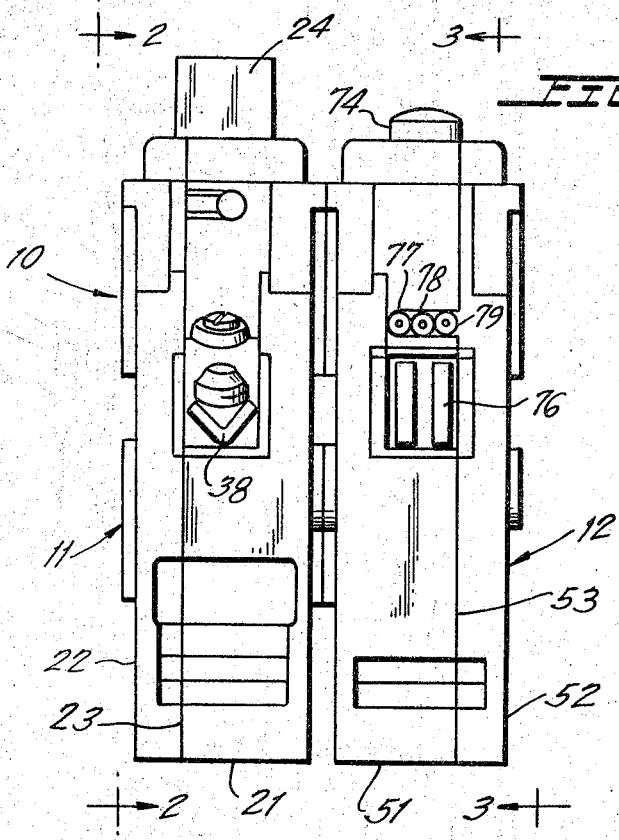
FIG. 1 is an elevation looking toward the load side of a ground fault interrupter unit constructed in accordance with teachings of the instant invention.
Figure 2:
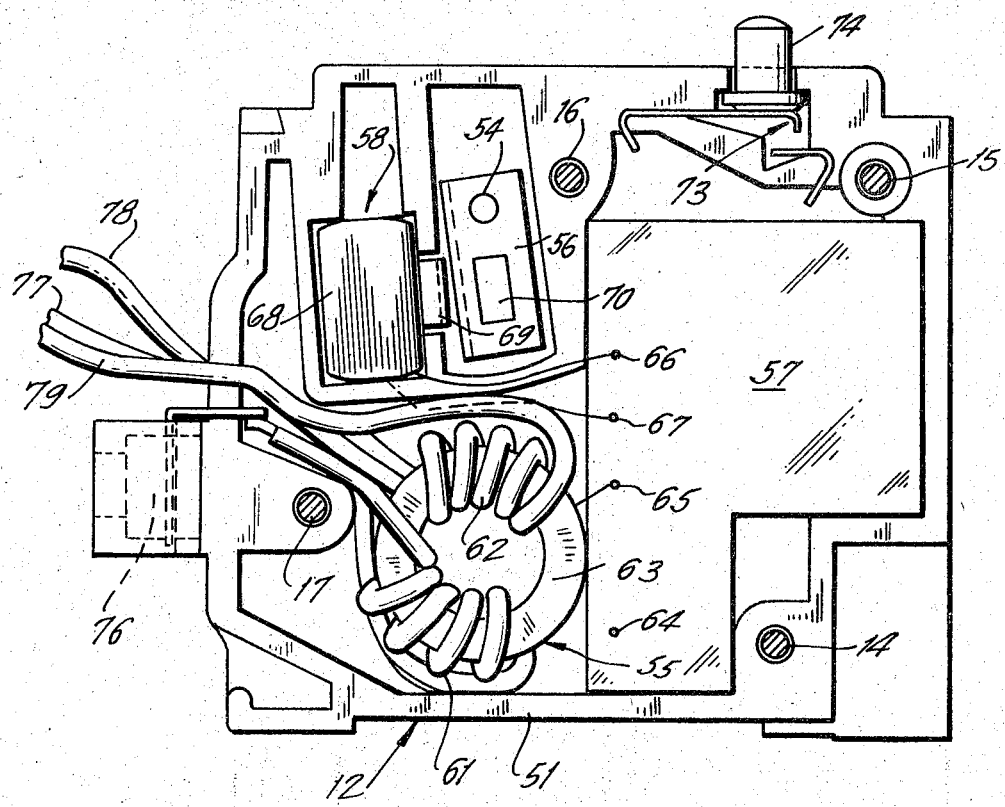
Figure 3:
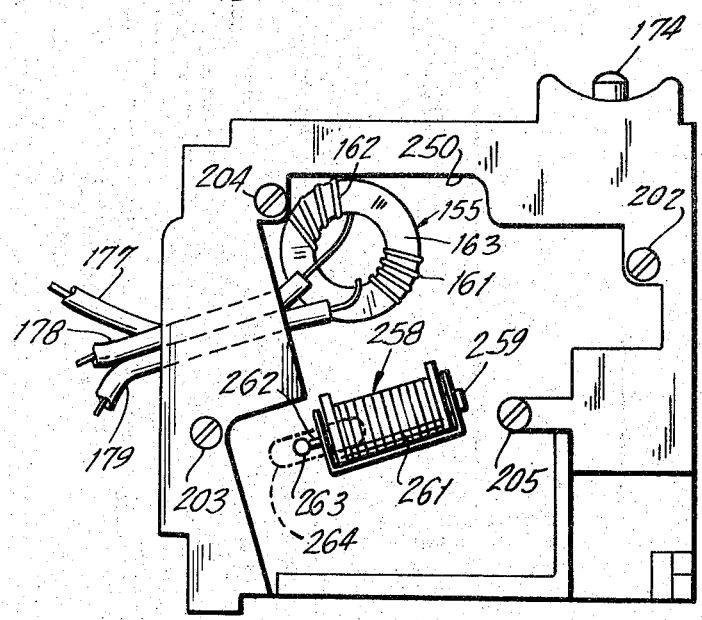
FIG. 3 is a side elevation of the ground fault detector module, looking in the direction of arrows 3—3 of FIG. 1, with the near side of the housing removed.
Figure 6:
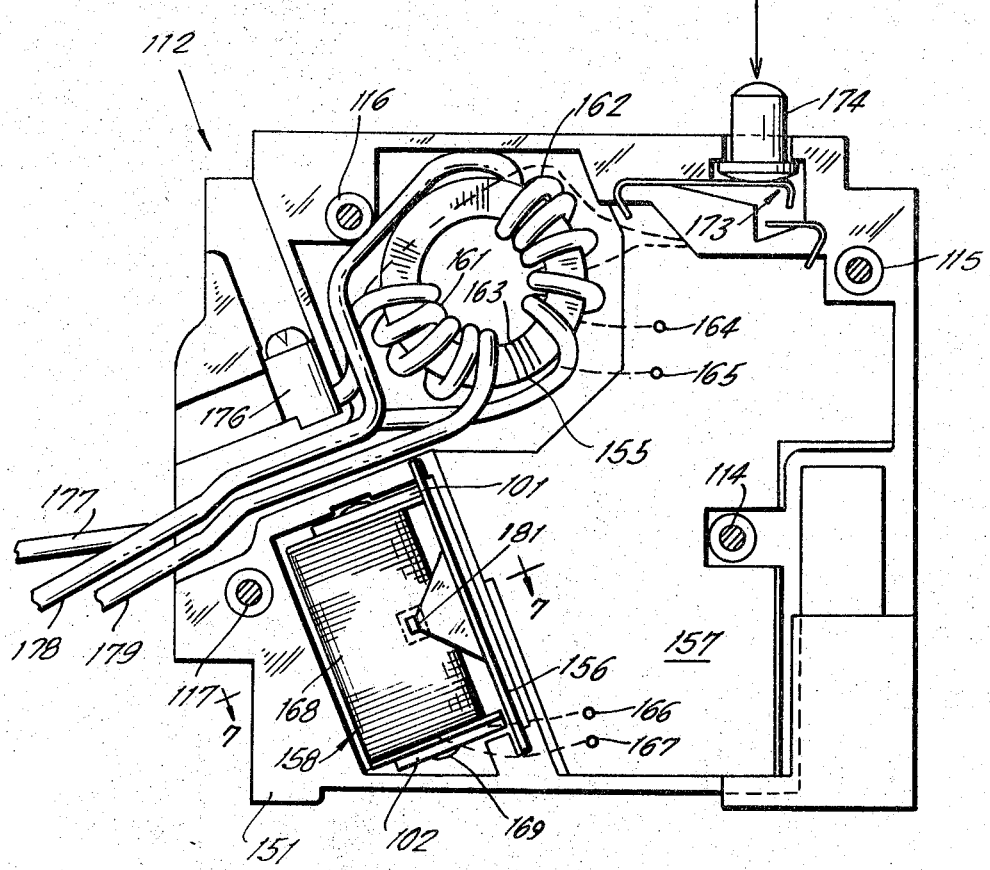
FIG. 6 is an elevation of the ground fault detector module, looking in the direction of arrows 6—6 of FIG. 4, with the near side of the housing removed.
Figure 7:
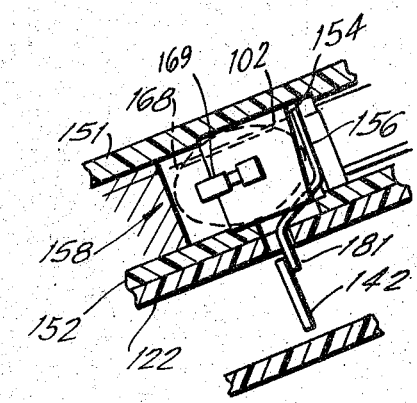
FIG. 7 is a fragmentary cross-section taken through line 7—7 of FIG. 6, looking in the direction of arrows 7—7 and showing engagement of the ground fault detector module trip extension with the overload responsive trip element of the circuit breaker module of FIG. 5.

Reference is now made to the figures and more particularly to FIGS. 1-3. Ground fault interrupter unit 10 of FIG. 1 includes circuit breaker module 11 and ground fault detector module 12, mounted in side-by-side relationship and secured together by at least two of the four rivets 14–17. Circuit breaker module 11 is a standard one inch wide single pole circuit breaker, of the type described in detail in U.S. Pat. No. 2,996,589, issued Aug. 15, 1961, to F. E. Myers for *Pivoted Bimetal*. Briefly, circuit breaker module 11 includes an insulating housing constructed of molded elements 21, 22, joined along line 23 and defining compartment means wherein the electrical and mechanical operating elements of module 11 are disposed.

Manual operating handle 24, pivoted at formation 25, has a manually engageable portion projecting out the top of housing 21, 22. The lower end of handle 24 supports the upper end of movable contact arm 26 having movable contact 44 at its lower end. Arm 26 is connected by tensioned main operating spring 27 to releasable cradle 28, mounted at one end thereof to pivot 29. The other end or latch tip 31 of cradle 28 is engageable by latch 32 carried by bimetal 33 at a point below its pivot mounting 34. Movable magnetic armature 36 is mounted to bimetal 33 below latch 32 and cooperates with relatively stationary yoke 37 to constitute a magnetic or instantaneous trip means.

The current path through circuit breaker module 11 consists of load terminal 38, braid 41 to the upper end of bimetal 33, through bimetal 33 to L-shaped strap 42, through braid 43 to contact arm 26 which carries movable contact 44 at the lower end thereof, and through contact 44 in engagement with stationary contact 45 to line terminal 39.

For a reason to be hereinafter explained, circuit breaker module 11 also includes trip member 46 mounted to pivot 34 and interposed between bimetal 33 and roller 47 mounted on cradle 28. When trip member 46 is pivoted counterclockwise with respect to FIG. 2, it engages and bodily pivots bimetal 33 in a counterclockwise direction, thereby moving latch 32 to the right with respect to FIG. 2, past latch tip 31 of cradle 28 to release the latter and permit spring 27 to separate movable contact 44 from stationary contact 45, thereby opening circuit breaker module 11.

Detector module 12 includes a compartment formed by the cooperation of molded insulating housing members 51, 52 joined side by side along line 53. Disposed within housing 51, 52 is a ground fault protecting means including balanced transformer 55, circuit board 57, and electromagnetic operator 58. Balanced transformer 55 includes identical primary windings 61, 62 of relatively few turns and secondary winding 63 having relatively many turns, with all three windings 61–63 being wound on a torroidal core. Lead 77 from one end of primary winding 61 and leads 78, 79 from primary winding 62 extend through an opening in the load end of housing 51, 52. A lead from the other end of winding 61 is connected directly to friction type wire-grip terminal 76 located at the load end of detector module 12 and accessible for connection with the lead of an external circuit. Secondary winding 63 is connected to circuit board 57 at input terminals 64, 65 thereof.

The elements (not shown) of printed circuit board 57 and those mounted thereon constitute means for amplifying signals fed thereto at input terminals 64, 65 and producing a control signal at output terminals 66, 67 to energize winding 68 of electromagnetic operator 58. Suitable circuitry for circuit board 57 is described in detail in U.S. Pat. No. 3,555,369, issued Jan. 12, 1971, to A. R. Morris et al. for a *Circuit Protective Device*. Although not illustrated, lead 77 is connected to circuit breaker load terminal 38.

Magnet operating winding 68 is wound about stationary pole piece 69, positioned in close proximity to movable magnetic armature 56. The latter is mounted to pivot 54 and, as will be seen, is biased away from pole piece 69 by coiled compression spring 71, which acts through bimetal 33 and element 46. Pivot 54 is in axial alignment with pivot 34 in circuit breaker module 11. Tie bar 70, positioned parallel to axes 34, 54, extends through aligned openings (not shown) in the sides of housing members 21 and 51 to mechanically tie trip member 46 with armature 56. Thus, when coil 68 of operator 58 is energized as a result of an unbalanced primary current condition detected at transformer 55, armature 56 is attracted to pole piece 69 and pivots in a clockwise direction with respect to FIG. 3. This movement of armature 56 is transmitted by tie bar 70 to move trip member 46 in a counterclockwise direction with respect to FIG. 2, thereby pivoting bimetal 33 counterclockwise about pivot 34 and releasing cradle latch tip 31 from latch 32 to cause separation of cooperating contacts 44, 45.

Detector module 12 also includes normally opened test switch 73 operated to closed position by depressing push-button 74. The closing of switch 73 simulates a ground fault thereby energizing operator 58.

Reference is now made more particularly to FIGS. 4–7, where ground fault interrupter unit 100 performs the same function as ground fault interrupter unit 10, but the former takes up much less space in a panelboard, requiring essentially only that space required by circuit breaker module 11. In particular, ground fault interrupter unit 100 includes circuit breaker module 111 and detector module 112, mounted in side-by-side relationship by at least two of the four rivets 114-117. Circuit breaker module 111 is a standard half-inch wide single pole circuit breaker, of the type described in detail in U.S. Pat. No. 3,152,232, issued Oct. 6, 1964, to J. H. Leonard for *Circuit Breaker Having Bimetal Rigidly Secured to Cradle*.

Briefly, circuit breaker module 111 includes an insulating housing constructed of molded elements 121, 122, joined along line 123 to define compartment means wherein the electrical and mechanical operating elements of module 11 are disposed. Manual operating handle 124, pivoted at housing formation 125, has a manually engageable portion projecting out of the top of housing 121, 122. Formed wire spring 126 connects handle 124 to movable contact arm 127 and biases the upper end 128 of contact arm 127 into abutment with the apex portion of an inverted V-shaped notch formed by cradle 131. The latter is pivoted at housing formation 132 and carries insulating latch tip member 133 on pivot 134. Pivotal movement of member 133 is limited by cradle formation 135. End 136 of bimetal strip 138 is fixedly secured to cradle 131. Formation 137 at the free end of bimetal 138 extends at right angles to the plane of movement for cradle 131 and normally maintains member 133 in position for engagement by latch 140. The latter is formed at one end of spring member 141 which carries magnetic armature 142 and biases the latter in a clockwise direction about pivot point 143, so as to normally form a V-shaped notch with the pole faces of U-shaped magnetic yoke 144.

The current path through circuit breaker module 111 extends from load terminal 145 through flexible braid 146 to the lower end of bimetal 138, through bimetal 138 to cradle 131 and its abutting connection with movable contact arm 127, through arm 127 and movable contact 147 carried by arm 127, and stationary contact 148 mounted to strap-like extension 149, and through extension 149 to line terminal 150.

Braid 146 passes between the arms of yoke 144 and forms the energizing turn for magnet 142 so that when fault current flows through circuit breaker module 111, armature 142 is attracted to yoke 144 thereby moving latch 140 to the right with respect to FIG. 5 to free latch tip member 133 and permit operating spring 126 to move cradle 131 in a counterclockwise direction with respect to FIG. 5 and separate movable contact 147 from stationary contact 148.

Detector module 112 includes a compartment formed by the cooperation of molded insulating housing members 151, 152 joined side by side along line 153. Disposed within housing 151, 152 is a ground fault protecting means including balanced transformer 155, circuit board 157 and electromagnetic operator 158. Balanced transformer 155 includes identical primary windings 161, 162 of relatively few turns and secondary winding 163, having many more turns than either of the primary windings 161 or 162. All three windings 161–163 are wound on a torroidal core, with one lead of winding 161 connected to load end terminal 176 and the other three primary winding leads (lead 177 from the other end of winding 161 and leads 178, 179 from winding 162) extending from housing 151, 152 at the load end thereof. The ends of secondary winding 163 are connected to circuit board 157 at input terminals 164, 165 thereof.

Printed circuit board 157 contains elements (not shown) for amplifying signals fed thereto at input terminals 164, 165 to produce a control signal at output terminals 166, 167, across which winding 168 of electromagnetic operator 158 is connected. Suitable circuitry for circuit board 157 is described in the aforesaid U.S. Pat. No. 3,555,369. Although not illustrated herein, lead 177 is connected to load terminal 145.

Magnet operating winding 168 is wound about core 169 and extends between stationary pole pieces 101, 102, positioned in close proximity to movable magnetic armature 156. The latter is mounted to pivot 154 and, as will be seen, is biased away from pole pieces 169 by spring 141 (FIG. 5) to normally form a V-shaped gap between armature 156 and pole pieces 101, 102.

Offset extension 181, projecting from armature 156 along the edge thereof remote from pivot 154, extends through aligned openings in housing parts 122, 152, with the free end of extension 181 being positioned behind armature 142 of circuit breaker module 111. Thus, when coil 168 of operator 158 is energized as a result of an unbalanced primary current position detected at transformer 155, armature 156 is attracted to pole pieces 101, 102 and pivots in a clockwise direction with respect to FIG. 7. This movement of armature 156 is transmitted by extension 181 thereof to move armature 142 about its pivot 143 against the force of biasing spring 141, thereby releasing latching extension 133 from latch 140 to cause separation of cooperating contacts 147, 148. It is noted that pivotal axes 143 and 154 are at right angles to each other.

Detector module 112 also includes normally open test switch 173 having operating push-buttons 174 extending through the top of housing 151, 152. The closing of 173 is effective to create an unbalanced condition in transformer 155 of sufficient magnitude to cause actuation of tripping magnet 158.

In the embodiment illustrated in FIGS. 8–10, ground fault interrupter unit 200 includes circuit breaker module 111 and ground fault detector module 201 mounted in side-by-side relationship and secured together by rivets 202, 203. The construction of circuit breaker module 111 has been described in connection with the embodiment of FIGS. 4–7. Detector module 201 is of the same construction as detector module 112 except that pivoted armature electromagnet 158 is replaced by linearly moving armature electromagnet 258 and housing part or cover 152 is replaced by retainer-spacer element 252.

More particularly, element 252 is joined to molded housing part 151 along line 251, being retained in position by two rivets 204, 205. Element 252 forms the boundaries defining three sides of opening 250 which extends over most of the area of the open side of housing member 151. Thus, the side of detector module 201 facing circuit breaker module 111 is essentially open, and in this manner additional depth is obtained for mounting the electrical elements of detector module 201. When modules 111 and 201 are secured together, housing part 122 of the former serves to cover the open side of module 201. Element 252 also serves to retain some of the electrical components of module 201 in their operative positions. In particular, element 252 maintains at least primary leads 177–179, load side terminal 176, and test switch 173, 174 in their operative positions.

Rod-like cylindrical armature 259 of electromagnet 258 extends axially through the center of energizing winding 261, and is axially movable from right to left with respect to FIGS. 9 and 10 upon energization of winding 261. The left end of armature 259, as viewed in FIG. 8, is provided with axial extension 262 having radial offset 263 at the free end thereof. Offset 263 extends through elongated slot 264 (shown phantomed in FIG. 9) in circuit breaker housing part 122 and lies adjacent to armature 142 in circuit breaker module 111. Slot 264 is slightly wider than the diameter of offset 263 so that slot 264 guides movement of offset 263 when winding 261 is energized. Upon the occurrence of a ground fault of sufficient magnitude being detected by module 201, electromagnet 258 is actuated to move its armature 259 axially to the left with respect to FIGS. 9 and 10, with radial projection 263 engaging and moving armature 142 to release circuit breaker latch 140, thereby bringing about separation of circuit breaker contacts 147, 148.

Thus, it is seen that the instant invention provides novel constructions for ground fault protection units that may be mounted in standard panelboards without modification of the panelboards. Each of the constructions hereinbefore described consists of two modules, mounted side by side, with one of these modules being a standard single pole circuit breaker.

Although in the foregoing there have been described preferred embodiments of this novel invention, many variations and modifications will now become apparent to those skilled in the art, and it is preferred therefore that the instant invention be limited not by the disclosure contained herein but only by the appending claims.

The embodiments of the invention in which an exclusive privilege or property is claimed are defined as follows:

1. Electrical protective equipment including housing means defining first and second compartments; a circuit breaker within said first compartment including a set of cooperating contacts, an operating means connected to said set of contacts and including an operating handle extending outside of said housing means and a latchable member, latch means for maintaining said member in latched position wherein said operating means through manual operation of said handle is effective to open and close said set of contacts, first pivot means mounting said latch means, overload sensing means for automatically moving said latch means about said first pivot means to release said latch means upon the occurrence of predetermined overload conditions; fault sensing means within said second compartment including a fault detecting means and an electromagnet that is energized by said fault detecting means upon the occurrence of predetermined fault conditions; said electromagnet including a relatively stationary magnetic yoke and an armature movable relative to said yoke; means extending between said compartments and operated by said armature upon attraction thereof by said yoke to move said latch means and thereby release said latchable member, whereby said operating means opens said set of contacts; said armature being mounted for movement along its axis and the means extending between said compartments projecting radially from the axis of said armature; said housing means including first and second housing modules defining the respective first and second compartments; said housing modules being generally of equal width and being secured together in adjacent side-by-side relationship; said first housing module having a first sidewall adjacent said second housing module; said first sidewall having an elongated slot extending parallel to the axis of the armature; said means extending between said compartments projecting through said elongated slot with movement of the former being guided by the latter.

2. Electrical protective means as set forth in claim 1 in which the second housing module includes first and second members secured together in side-by-side relationship; said second member having an enlarged opening and constituting a retaining element providing a generally open side adjacent said first housing module; said first housing module providing an insulating cover for said generally open side; said retaining element including formations that retain at least some of the elements of said fault sensing means within said second compartment prior to securing said housing modules together.

3. Electrical protective equipment including housing means defining first and second compartments; a circuit breaker within said first compartment including a set of cooperating contacts, an operating means connected to said set of contacts and including an operating handle extending outside of said housing means and a latchable member, latch means for maintaining said member in latched position wherein said operating means through manual operation of said handle is effective to open and close said set of contacts, overload sensing means for automatically moving said latch means to release said latch means upon the occurrence of predetermined overload conditions; fault sensing means within said second compartment; means operatively connected to said latch means and actuated by detection of predetermined fault conditions by said sensing means to move said latch means and thereby release said latchable member, whereby said operating means opens said set of contacts; said housing means including first and second housing modules defining the respective first and second compartments; said housing modules being generally of equal width and being secured together in adjacent side-by-side relationship; said first housing module having a first generally closed widewall adjacent said second housing module; said second housing module including first and second members secured together in side-by-side relationship; said second member having an enlarged opening and constituting a retaining element providing a generally open side adjacent said first housing module; said first housing module providing an insulating cover for said generally open side; said retaining element including formations that retain at least some of the elements of said fault sensing means within said second compartment prior to securing said housing modules together.

* * * * *